(12) United States Patent
Haupt et al.

(10) Patent No.: US 6,696,914 B2
(45) Date of Patent: Feb. 24, 2004

(54) ELECTRICAL FUSE FOR ROTARY CURRENT GENERATOR WITH RECTIFIER

(75) Inventors: Martin Haupt, Cowbridge (GB); Herbert Labitzke, Markgroeningen (DE); Walter Csicser, Schwieberdingen (DE); Klaus-Uwe Mittelstaedt, Weissach (DE); Holger Scholzen, Schwieberdingen (DE); Karl-Otto Heinz, Remseck (DE); Holger Haussmann, Metzingen (DE); Henning Stilke, Rotenburg/Wuemme (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 09/914,409

(22) PCT Filed: Dec. 21, 2000

(86) PCT No.: PCT/DE00/04568

§ 371 (c)(1),
(2), (4) Date: Jan. 25, 2002

(87) PCT Pub. No.: WO01/50577

PCT Pub. Date: Jul. 12, 2001

(65) Prior Publication Data

US 2003/0071711 A1 Apr. 17, 2003

(30) Foreign Application Priority Data

Dec. 29, 1999 (DE) .......................................... 199 63 622

(51) Int. Cl.[7] ........................ H01H 85/08; H01H 85/20; H01R 13/68
(52) U.S. Cl. ........................ 337/295; 337/187; 337/227; 337/290; 439/621; 439/890; 439/893; 361/20; 361/837
(58) Field of Search ................................. 337/159, 186, 337/187, 227, 290, 295; 439/621, 622, 890, 893; 361/837, 20

(56) References Cited

U.S. PATENT DOCUMENTS

| | | | | |
|---|---|---|---|---|
| 2,442,445 A | * | 6/1948 | Toelle | 337/96 |
| 2,729,802 A | * | 1/1956 | Jordan et al. | 439/830 |
| 3,017,558 A | * | 1/1962 | Kozacka | 363/53 |
| 3,943,407 A | * | 3/1976 | Bolasny | 361/229 |
| 4,050,045 A | * | 9/1977 | Motten, Jr. et al. | 337/187 |
| 4,218,109 A | * | 8/1980 | Kneusels | 439/621 |
| 4,361,867 A | * | 11/1982 | Frister et al. | 363/145 |
| 4,531,806 A | * | 7/1985 | Hsieh | 439/621 |
| 4,683,390 A | * | 7/1987 | Imori et al. | 310/71 |
| 4,782,240 A | * | 11/1988 | Davidson | 307/10.7 |
| 4,808,866 A | * | 2/1989 | Kawazoe et al. | 310/68 D |
| 5,326,655 A | * | 7/1994 | Mix et al. | 429/178 |
| 5,643,693 A | * | 7/1997 | Hill et al. | 429/121 |
| 5,645,448 A | * | 7/1997 | Hill | 439/522 |

(List continued on next page.)

FOREIGN PATENT DOCUMENTS

| | | | | |
|---|---|---|---|---|
| DE | 30 01 522 A1 | | 7/1981 | |
| DE | 19741830 A1 | * | 3/1999 | .......... H01H/85/02 |
| DE | 19936279 A1 | * | 2/2000 | .......... H01H/85/055 |
| FR | 2358742 A | * | 3/1978 | .......... H01H/85/08 |
| FR | 2732823 A1 | * | 10/1996 | .......... H01R/13/68 |
| GB | 1417913 A | * | 12/1975 | ............. H02J/7/14 |
| JP | 11040041 A | * | 2/1999 | .......... H01H/85/54 |
| JP | 2001273848 A | * | 10/2001 | .......... H01H/85/12 |
| JP | 2002136076 A | * | 5/2002 | .......... H02K/19/36 |
| WO | WO 8801790 A1 | * | 3/1988 | .......... H01H/85/00 |

*Primary Examiner*—Anatoly Vortman
(74) *Attorney, Agent, or Firm*—Michael J. Striker

(57) ABSTRACT

The invention relates to an electrical fuse for rotary current generators, having a rectifier assembly (14) for supplying a DC network, in particular in motor vehicles. To achieve simple, cost-effective and rapid-response fuse performance in the event of an overload, it is provided that a fuse element (21) be disposed in a line strand, carrying all the generator current, between the rectifier assembly (14) and a DC connection terminal (22) of the generator.

13 Claims, 2 Drawing Sheets

U.S. PATENT DOCUMENTS

Figure 1:
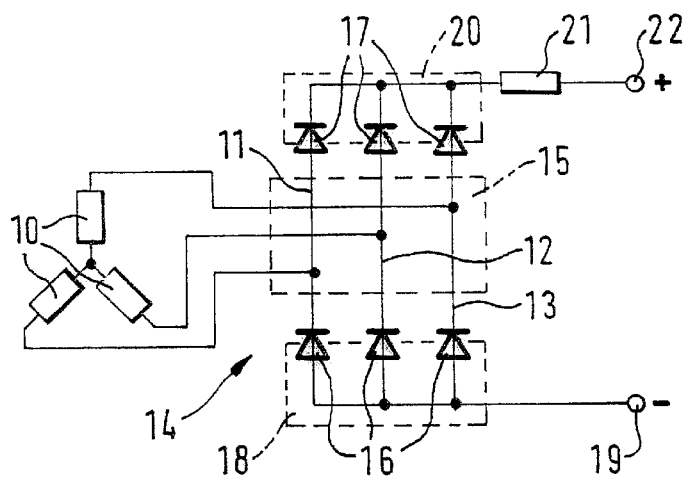

| | | | |
|---|---|---|---|
| 5,805,047 A | * 9/1998 | De Villeroche et al. | 337/290 |
| 5,818,122 A | * 10/1998 | Miyazawa et al. | 307/10.7 |
| 6,222,439 B1 | * 4/2001 | Tanigawa et al. | 337/401 |
| 6,294,978 B1 | * 9/2001 | Endo et al. | 337/166 |
| 6,509,824 B2 | * 1/2003 | Inaba et al. | 337/295 |
| 6,512,443 B1 | * 1/2003 | Matsumura et al. | 337/189 |
| 2002/0098413 A1 | * 7/2002 | Hulbert et al. | 429/178 |
| 2002/0163416 A1 | * 11/2002 | Matsumura | 337/112 |
| 2002/0167772 A1 | * 11/2002 | Haupt et al. | 361/104 |

* cited by examiner

ELECTRICAL FUSE FOR ROTARY CURRENT GENERATOR WITH RECTIFIER

The invention relates to an electrical fuse for rotary current generators, having a rectifier assembly for supplying a DC network, in particular in motor vehicles, as generically defined by the preamble to the main claim.

PRIOR ART

In motor vehicles, to an increasing extent electrical devices are being used to improve the comfort and safety of the motor vehicles. For supplying these devices from the on-board electrical system of the motor vehicles, in by far the most cases, rotary current generators are used, which have a high power density and are thus under severe thermal loads. A rectifier assembly is as a rule integrated with the housing of the rotary current generators, so that only the DC output of this assembly forms the connection terminals of the generator, to which the connection cables of an accumulator battery of the on-board vehicle electrical system are connected. In the event of an overload or a short circuit at the generator or the rectifier assembly, which not infrequently happens in motor vehicles whenever a battery charging device is connected to the discharging battery with the wrong polarity, not only can the generator or the rectifier assembly be destroyed, but this can also trigger still further damage to the vehicle.

To avoid these dangers, it is already known from German Patent DE 30 01 522 C2, to dispose fuse elements in the rectifier assembly, between the connections of the positive and negative diodes of the three rectifier bridges. The fuses, which because of production variations have only very imprecise response values, are formed by line portions bent in a loop from recesses in a printed circuit board of the rectifier assembly; these loops melt open in the event of an electrical overload and can be temporarily repaired again by twisting the ends together. Since the terminals of the thus-protected power diodes of the rectifier assembly are soldered or welded to the printed circuit board, once a fuse has responded, the entire rectifier assembly later has to be replaced, which is expensive and time-consuming. Moreover, there is the risk that the fuse that has responded will be only temporarily repaired or in other words bypassed, without the rectifier assembly being replaced at the next opportunity. In that case, the risk of destruction and overheating increases quite considerably. If the response of a fuse in one of the three rectifier bridges goes unrecognized, the two intact rectifier bridges are then loaded all the more heavily, so that finally they fail as well.

The object of the present invention is to accomplish protection of the generator and the rectifier assembly from electrical overload or short circuit as simply and reliably as possible.

ADVANTAGE OF THE INVENTION

The electrical fuse of the invention having the characteristic of the body of claim 1 has the advantage over the prior art that when the fuse responds, the generator along with the rectifier assembly is shut off completely, making the response of the fuse clearly apparent from the interruption in the charging process. A further advantage is that if a battery charging device is connected with the wrong polarity, it is no longer necessary—as it was until now—for all three fuses in the three rectifier bridges to respond; instead, from the response of one fuse, the generator is completely disconnected from the on-board electrical system, thus averting the risk of overheating.

Advantageous refinements and embodiments are attained from the other characteristics recited in the dependent claims. For instance, an especially expedient embodiment that is simple from a production standpoint is obtained if the fuse element is disposed between a heat sink, forming the positive pole, of the bridge rectifier and a positive connection bolt of the generator. The positive connection bolt is fastened in insulated and detachable fashion in a hole of the positive heat sink.

For the sake of changing the fuse as easily as possible if the fuse has responded, it is expedient to slip the fuse element, together with an insulator part embracing the head of the positive connection bolt, onto the positive connection bolt and to be put into electrical contact with it on the face end of the head. For the sake of the most reliable possible contacting, it is also proposed that the positive connection bolt, insulator part and fuse element form a prefabricated component unit, in that the fuse element is galvanically connected, preferably welded, by one terminal, to the connection bolt head, on the face end thereof. In this case, the complete component unit is replaced after the fuse has responded.

The most reliable and simple connection of the fuse element to the positive heat sink is attained in that with its other terminal, the fuse element is embodied annularly and is placed on a collar, embracing the connection bolt, of the insulator part, and this terminal, on its top side, is put into electrical contact with the positive heat sink by pressure when the connection bolt is tightened.

Very simple production of the fuse element can be achieved in that the fuse element is a stamped metal part, which between its two terminals has a portion of narrowed cross section, embraced laterally on the head of the positive connection bolt by the insulator part, which portion melts away in the event of an overload.

To prevent a direct connection of the positive heat sink to the positive connection bolt and thus to prevent bypassing of the fuse element, an insulating disk is advantageously placed on the positive connection bolt above the positive heat sink, in order to insulate the heat sink from a protective cap secured in a manner known per se to the connection bolt.

As alternative to the aforementioned replacement of the entire component unit with the fuse element, the embodiment can expediently also be designed in terms of its construction such that only the fuse element has to be replaced after its response. In that event, it is provided that the positive connection bolt is embraced at its head region by an insulator part and protrudes in insulated fashion through the hole in the positive heat sink, the fuse element being placed on the positive connection bolt in such a way that with its lower terminal, it rests on the positive heat sink, and with its upper terminal, it is put into electrical contact with the positive connection bolt by means of a nut.

Also in this respect, it is provided that the fuse element is embodied of an annular, disklike insulating substrate body, which on each of its two face ends has a respective annular-disklike terminal, and a melting portion of narrowed cross section is moved laterally past the insulating substrate body between the two terminals.

For the sake of safety, to make it possible to fasten the portion that melts away upon response of the fuse in a predetermined position, secure against rotation and positionally securely, on the positive connection bolt, this portion is guided around a platelike protrusion, formed laterally onto the insulating substrate body, that embraces the melting portion on both sides. In addition, this protrusion is positionally fixed on both sides by lugs that are formed onto the positive heat sink.

Since this fuse element can also be put on the market as a spare part, the insulating substrate body must not fall out between the two terminals of the fuse element before installation. To that end, it is provided that the two annular-disklike terminals of the fuse element embrace the insulating substrate body on its outer edge, in each case by means of angled tongues.

DRAWING

Further details of the invention are described in further detail in the two exemplary embodiments described below in conjunction with the associated drawing.

Figure 2:
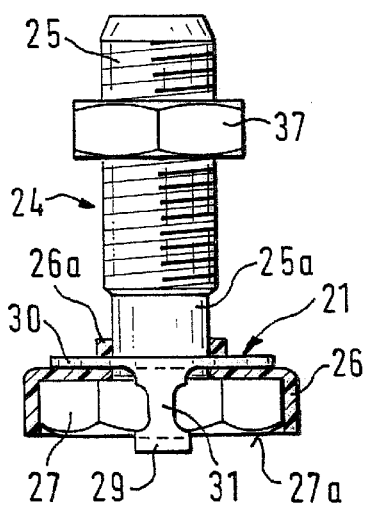
Figure 3:
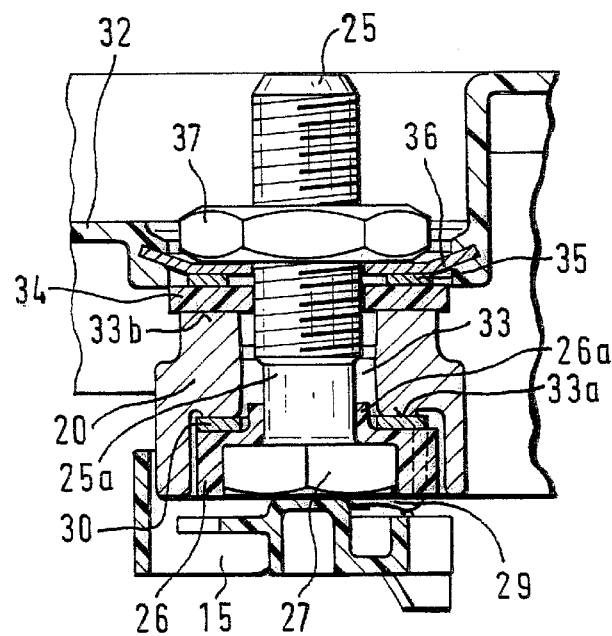
Figure 4:
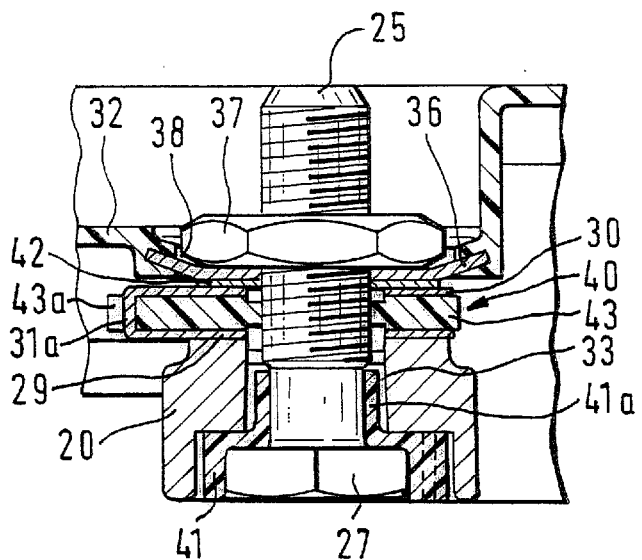
Figure 5:
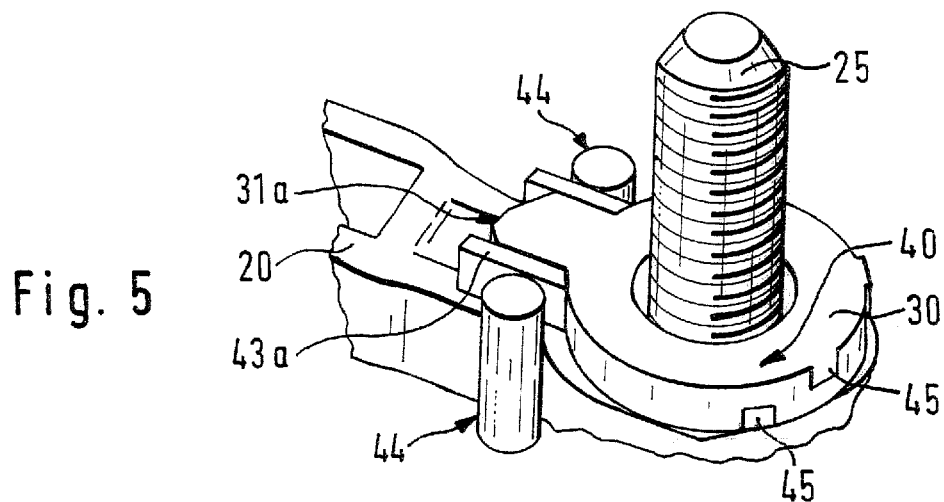
Figure 6:
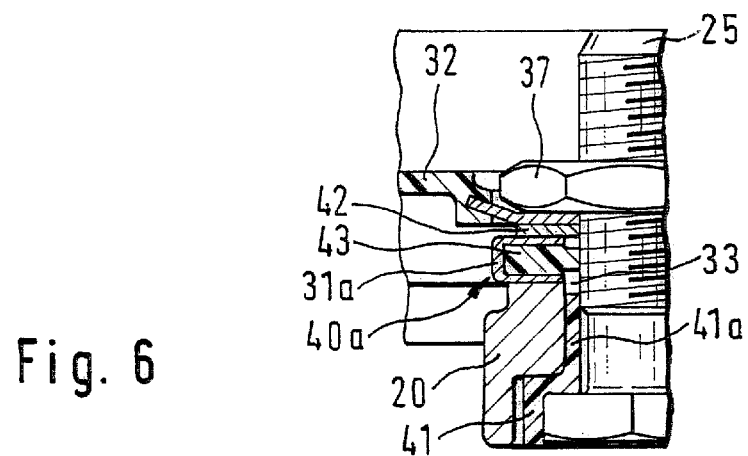

Shown are:

FIG. 1, the circuit of the rotary current generator along with the rectifier assembly and the fuse;

FIG. 2, as a first exemplary embodiment, the positive connection bolt with the fuse as a prefabricated component unit, and FIG. 3, a sectional view of the positive connection bolt with the fuse, mounted on the positive heat sink;

FIG. 4, as the second exemplary embodiment, a cross section of the rectifier assembly in the region of the positive connection bolt;

FIG. 5, in a three-dimensional view, the fuse element seated on the positive connection bolt in a manner secure against relative rotation; and FIG. 6, in fragmentary section, a variant of the second exemplary embodiment of FIG. 4.

DESCRIPTION OF THE EXEMPLARY EMBODIMENTS

In FIG. 1, the three phases 10 of a rotary current generator are shown, which by one end are combined into a "Y" connection and by their other end are connected to a respective diode bridge 11, 12 and 13 of a rectifier assembly 14. For interconnection of the three phases 10 to the three diode bridges, there is a printed circuit board 15, and each of the three diode bridges comprises one negative diode 16 and positive diode 17 connected in series. The negative diodes are press-fitted on the anode side into a negative heat sink 18, and the anode terminals of the negative diodes 16 are thus combined by means of the negative heat sink 18 to form a negative terminal 19. The positive diodes 17 are press-fitted on the cathode side into a positive heat sink 20. In this heat sink 20, the cathode terminals of the positive diodes 17 are combined and connected via a fuse element 21 to a positive terminal 22 of the rectifier assembly 14. The fuse element 21 is dimensioned such that in order to protect the generator and the rectifier diodes 16, 17, it melts open if the allowable maximum direct current (DC) is exceeded, and thus interrupts the current circuit on the generator side. This can happen for instance in the event of incorrect polarity when a battery charging device is connected.

FIG. 2 shows a prefabricated component unit 24 comprising a positive connection bolt 25, an insulator part 26 shown in section, and the fuse element 21. The positive connection bolt 25 forms a DC connection terminal of the rotary current generator for the positive connection cable of an accumulator in the on-board electrical system of a motor vehicle. The insulator part 26 is embodied such that it embraces the head 27 of the connection bolt 25. It is also provided with a collar 26a that embraces the shaft 25a. The fuse element 21 is slipped onto the positive connection bolt 25 together with the insulator part 26 and put into electrical contact with the head 27 on the face end 27a of the head, being solidly welded by its lower terminal 29 to the face end 27a of the head 27. With its upper terminal 30, it is embodied annularly and is slipped onto the collar 26a of the insulator part 26. The fuse element 21 is a stamped metal part, which between its two terminals 29, 30 has a portion 31 of narrowed cross section, embraced laterally on the head 27 of the positive connection bolt 25 by the insulator part 26, which portion melts away in the event of an overload.

In FIG. 3, the positive connection bolt 25 is shown together with the fuse element 21 and a protective cap 32, in cross section mounted on the positive heat sink 20. The shaft 25a of the connection bolt 25 protrudes in insulated fashion through a hole 33 in the positive heat sink 20, and the collar 26a of the insulator part 26 protrudes into the hole 33, and furthermore the lower edge 33a of the hole 33 rests on the top side of the upper terminal 30 of the fuse element 21. The upper edge 33b of the hole 33 carries an insulating ring 34, on which the protective cap 32, via a spring disk 35, is braced with an injected clamping disk 36. The parts are tightened against one another by a nut 37 placed on the positive connection bolt 25. On the one hand, this pressure-contacts the positive heat sink 20 to the upper terminal 30 of the fuse element 21, and on the other hand the positive heat sink is insulated by the insulating ring 34 from the clamping disk 36 of the protective cap 32 and thus also from the nut 37 and the connection bolt 25, to prevent electrical bypassing of the fuse element 21.

Since the fuse is disposed, in the form of a fuse element 21, 40, in a line segment that carries all the generator current between the rectifier assembly 14 and a generator connection terminal 22, 25 of the generator, in the event of a response upon an overload the fuse element 21 can easily be replaced. Since the positive connection bolt 25 is secured detachably in the positive heat sink 22, in that event the entire component unit 24 of FIG. 2 can be replaced.

In a second exemplary embodiment shown in FIGS. 4 and 5, the same elements have the same reference numerals as in the first exemplary embodiment. However, here the fuse element 40 is embodied such that after response, it can be replaced by itself. Once again the positive connection bolt 25 is embraced here in its head region 27 by an insulator part 41, which with a collar 41a protrudes into the hole 33 of the positive heat sink 20. The fuse element 40 is placed on the end of the positive connection bolt 25 that protrudes through the hole 30 in such a way that it rests with its lower terminal 29 on the positive heat sink 20. With its upper terminal 30, it is put into electrical contact with the positive connection bolt 25 by means of the nut 37, in that first a contact disk 42 rests on the upper terminal 30. Onto this contact disk 42, the protective cap 32 is now placed, with the clamping disk 36 injected on the edge of the fastening opening 38, onto the positive connection bolt 25. The protective cap 32, contact disk 42, fuse element 40, heat sink 20 and insulator part 41 are finally tightened firmly with the nut 37 placed on the thread of the connection bolt 25.

The fuse element 40 here comprises an annular, disklike insulating substrate body 43, with one annular-disklike terminal 29, 30 on each of its two end faces, and with a melting portion 31a of narrowed cross section, which is moved laterally past the insulating substrate body 43 between the two terminals 29, 30 and which melts away in the event of an overload. From the three-dimensional view in FIG. 5, it can be seen that the melting portion 31a is guided around a platelike protrusion 43a, formed laterally onto the insulating substrate body 43, that embraces the melting portion 31a on both sides. For positional fixation of the fuse element 40 on the positive connection bolt 25, two lugs 44 are formed onto the positive heat sink 20, which embrace the protrusion 43a of the insulating substrate body 43 on both sides and thus embrace it in a manner secure against relative rotation. In addition, the parts of the fuse element 40 are held together in such a way that the two annular-disklike terminals 29 and 30 each embrace the insulating substrate body 43 by means of angled tongues 45.

The positional fixation of the fuse element 40 has the advantage that it can thus be assured that melting portion 31a will not come into contact with metal components of the rectifier assembly and thus bypass the fuse function. This also prevents the melting portion 31a from coming into contact with temperature-sensitive materials, such as the protective cap 32, and finally, the positional fixation makes it possible to shift the rectifier assembly with the fuse element 40 placed on it, without any change occurring in its position. The spacing of the two lugs 44, which can be embodied in any arbitrary cross-sectional shape, on the positive heat sink 20 from one another should be selected such that the fuse element 40 can be inserted with its protrusion 43a between the two lugs 44 without restriction in the joining direction. This positional fixation is possible without additional components, since it can be recessed out of an existing mold for the positive heat sink, using simple tools.

If the rectifier assembly and the protective cap 32 are embodied such that the melting portion 31a of the fuse element 40 has an adequate safety spacing from them anyway, then a positional fixation of the fuse element can also be omitted. FIG. 6 shows an alternative version for this purpose, in which the protrusion 43a on the insulating substrate body 43 has been left out. Here, the fuse element 40a is placed annularly onto the positive connection bolt 25 and tightly fastened between the positive heat sink 20 and the contact disk 42 by the nut 37. Its melting portion 31a can be seated at any arbitrary point on the circumference of the insulating substrate body 43.

What is claimed is:

1. An electrical fuse (21, 40) for rotary current generators, having a rectifier assembly (14) for supplying a dc network, in particular in motor vehicles, characterized in that the fuse is disposed, in the form of a fuse element (21, 40), in a line segment carrying all the generator current, between the rectifier assembly (14) and a generator connection terminal (22, 25) of the generator, wherein the fuse element (21, 40) is disposed between a heat sink (20), forming the positive pole, of the rectifier assembly (14) and a positive connection bolt (25) of the generator, forming the generator connection terminal (22), and the positive connection bolt (25) is secured in insulated fashion and detachably on the positive heat sink (20) in a hole (33) in the positive heat sink (20).

2. The electrical fuse of claim 1, wherein the fuse element (21), together with an insulator part (26) that embraces the head (27) of the positive connection bolt (25), is slipped onto the positive connection bolt (25) and put into electrical contact with it on the face end (27a) of the head (27).

3. The electrical fuse of claim 2, wherein the positive connection bolt (25), insulator part (26) and fuse element (21) form a prefabricated component unit (24), in that the fuse element (21) is galvanically connected, preferably welded, by one terminal (29), to the connection bold head (27), on the face end (27a) thereof.

4. The electrical fuse of claim 3, wherein with its other terminal (30), the fuse element (21) is embodied annularly and is placed on a collar (26a), embracing the connection bolt (25), of the insulator part (26), so that this terminal, on its top side, is put into electrical contact with the positive heat sink (20) by pressure.

5. The electrical fuse of claim 4, wherein the fuse element (21) is a stamped metal part, which between its two terminals (29, 30) has a portion (31) of narrowed cross section, embraced laterally on the head (27) of the positive connection bolt (25) by the insulator part (26), which portion melts away in the event of an overload.

6. The electrical fuse of claim 2, wherein an insulating ring (34) is placed on the connection bolt (25) on the positive heat sink (25), in order to insulated the positive heat sink (20) from a protective cap (32) that is secured in a manner known per se on the connection bolt (25).

7. The electrical fuse of claim 1, wherein the positive connection bolt (25) is embraced at its head region (27) by an insulator part (41) and protrudes in insulated fashion through the hole (33) in the positive heat sink, the fuse element (40) being placed on the positive connection bold (25) in such a way that with its lower terminal (29), it rests on the positive heat sink (20), and with its upper terminal (30), it is put into electrical contact with the positive connection bolt (25) by means of a nut (37).

8. The electrical fuse of claim 7, wherein the fuse element (40) is embodied of an annular, diskilke insulating substrate body (43), which on each of its two ends has a respective annular-disklike terminal (29, 30), and a melting portion (31, 31a) of narrowed cross section is moved laterally past the insulating substrate body (43) between the two terminals (29, 30).

9. The electrical fuse of claim 8, wherein the melting portion (31a) is guided around a platelike protrusion (43a), formed laterally onto the insulating substrate body (43), that embraces the melting portion (31a) on both sides.

10. The electrical fuse of claim 9, wherein the protrusion (43a) of the insulating substrate body (43) is embraced and positionally fixed on both sides by lugs (44) formed onto the positive heat sink (20).

11. The electrical fuse of claim 8, wherein the two annular-diskilke terminals (29, 30) of the fuse element (40) embrace the insulating substrate body (43) on its outer edge, in each case by means of angled tongues (44).

12. The electrical fuse of claim 7, wherein a contact disk (42) slipped onto the positive connection bolt (45) rests on the upper terminal (29) of the fuse element (40) and is firmly fastened, together with the fuse element (40) and the positive heat sink (20), on the positive connection bolt (25) by the nut (37).

13. The electrical fuse of claim 12, wherein a clamping disk (36) injected into a fastening opening (38) of a protective cap (32) is fastened between the contact disk (42) and the nut (37).

* * * * *